Sept. 12, 1972  E. H. LAND  3,690,879
PHOTOGRAPHIC DIFFUSION TRANSFER COLOR PROCESS AND
COMPOSITE FILM UNIT FOR USE THEREIN
Filed March 4, 1971  4 Sheets-Sheet 1
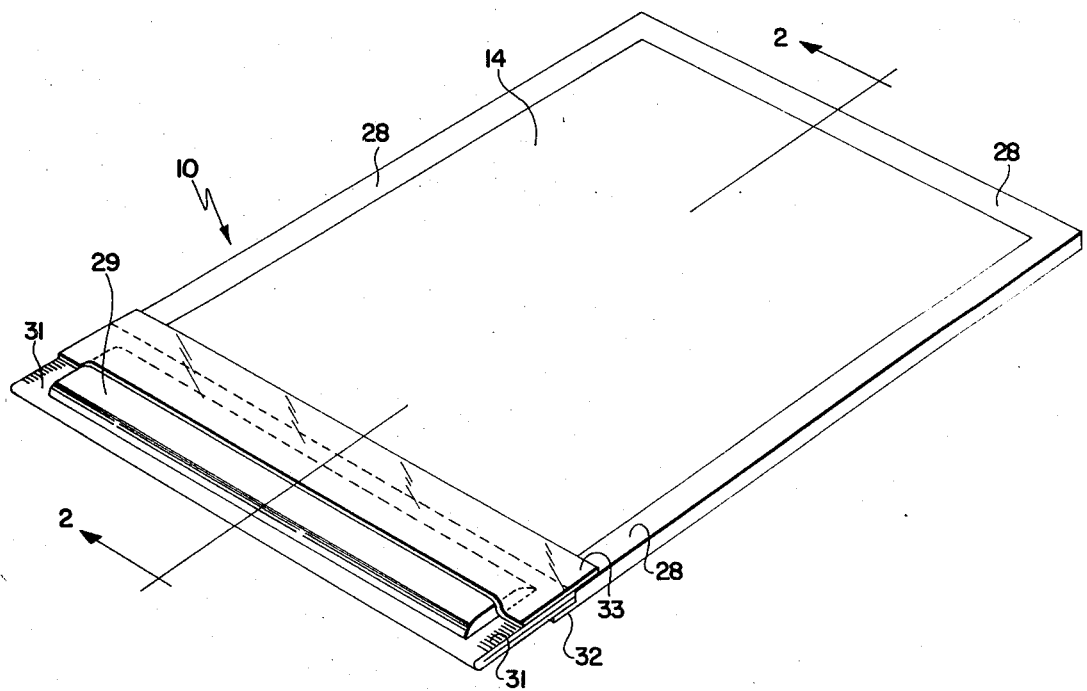
FIG. I
INVENTOR.
EDWIN H. LAND
BY
Brown and Mikulka
and
Alvin Isaacs
ATTORNEYS

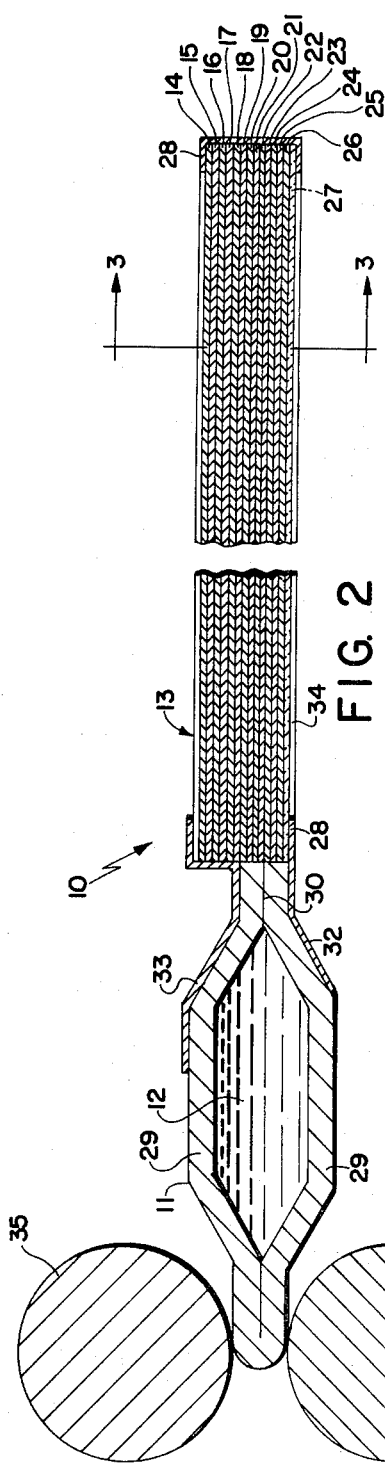
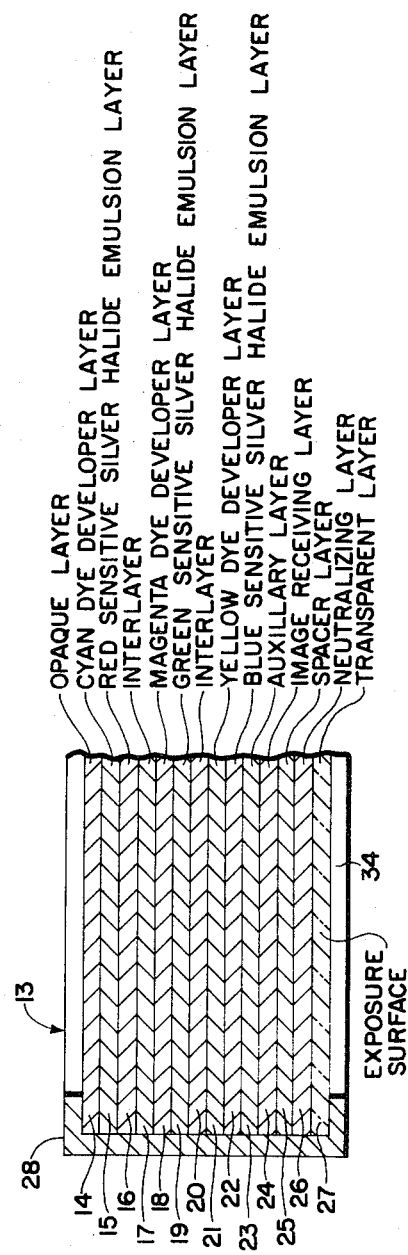

Sept. 12, 1972 E. H. LAND 3,690,879
PHOTOGRAPHIC DIFFUSION TRANSFER COLOR PROCESS AND
COMPOSITE FILM UNIT FOR USE THEREIN
Filed March 4, 1971 4 Sheets-Sheet 3

INVENTOR.
EDWIN H. LAND
BY
Brown and Mikulka
and
Alvin Isaacs
ATTORNEYS

Sept. 12, 1972 E. H. LAND 3,690,879
PHOTOGRAPHIC DIFFUSION TRANSFER COLOR PROCESS AND
COMPOSITE FILM UNIT FOR USE THEREIN
Filed March 4, 1971 4 Sheets-Sheet 4

INVENTOR.
EDWIN H. LAND
BY
Brown and Mikulka
and
Alvin Isaacs
ATTORNEYS

United States Patent Office 3,690,879
Patented Sept. 12, 1972

3,690,879
PHOTOGRAPHIC DIFFUSION TRANSFER COLOR PROCESS AND COMPOSITE FILM UNIT FOR USE THEREIN
Edwin H. Land, Cambridge, Mass., assignor to Polaroid Corporation, Cambridge, Mass.
Continuation-in-part of application Ser. No. 782,075, Dec. 9, 1968. This application Mar. 4, 1971, Ser. No. 120,942
The portion of the term of the patent subsequent to Mar. 30, 1988, has been disclaimed
Int. Cl. G03c 7/00
U.S. Cl. 96—3
17 Claims

ABSTRACT OF THE DISCLOSURE

Photographic film units and processes employing the same to obtain a color transfer print viewable without separation of the layer containing same as a reflection print, which film unit comprises a negative component comprising at least one light-sensitive silver halide layer having associated therewith, in the same and/or in an adjacent layer, a dye image-forming material for providing, as a function of development of the associated silver halide, an imagewise distribution of a mobile and diffusible color-providing material; and a positive component comprising at least a dyeable stratum adapted for receiving said diffusible color-providing material to provide a color transfer image; means for providing an opacifying agent between said negative and positive components to mask said negative component and to provide a background for viewing the color transfer image imparted to said dyeable stratum by reflected light without separation of said positive component containing said transfer image from said negative component; said positive and negative components being confined in superposition between a pair of dimensionally stable layers or support members, one of which is vapor permeable to permit osmotic transpiration of processing composition solvent to decrease the solvent concentration of the processing composition applied to develop said film unit from a first solvent concentration at which the dye image-forming material is soluble and diffusible to a second solvent concentration at which it is substantially non-diffusible, the other of said dimensionally stable layers being impervious or relatively impervious to solvent vapor, at least the dimensionally stable layer associated with the positive component being substantially transparent to permit viewing therethrough of the color transfer image, the other of said dimensionally stable layers, i.e., the one associated with the negative component, preferably being opaque.

The film unit preferably additionally includes means for applying between said negative and positive components an aqueous alkaline processing composition having said first solvent concentration, and the film unit further preferably contains means for reducing the pH of said processing composition subsequent to substantial dye transfer image formation.

BACKGROUND OF THE INVENTION (1) Field of the invention

The present invention is directed to providing new and improved reflection type diffusion transfer process photographic film units which comprise a composite photosensitive element adapted to provide, as a function of the point-to-point degree of photoexposure, integral negative and positive images which include a negative image in a superposed relationship with and optically masked from a positive image adapted to be viewed by reflected light.

(2) Cross-references to related applications

This application is in part a continuation of my copending U.S. application Ser. No. 782,075, filed Dec. 9, 1968 and now U.S. Pat. No 3,573,044

As disclosed in my U.S. application Ser. No. 622,283, filed Mar. 10, 1967, now U.S. Pat. No. 3,415,644, a composite photosensitive structure, particularly adapted for reflection type photographic diffusion transfer color process employment, which comprises a plurality of essential layers including, in sequence, a dimensionally stable opaque layer; one or more silver halide emulsion layers having associated therewith dye image-providing material which is soluble and diffusible, in alkali, at a first pH, as a function of the point-to-point degree of its associated silver halide emulsion's exposure to incident actinic radiation; a polymeric layer adapted to receive solubilized dye image-providing material diffusing thereto; a polymeric layer containing sufficient acidifying capacity to effect reduction of a processing composition from the first pH to a second pH at which the dye image-providing material is substantially nondiffusible; and a dimensionally stable transparent layer, may be exposed to incident actinic radiation and processed by interposing, intermediate the silver halide emulsion layer and the reception layer, an alkaline processing composition possessing the first pH and containing opacifying agent, which may reflect incident radiation, in a quantity sufficient to mask dye image-providing material associated with the silver halide emulsion.

In a preferred embodiment, the composite photosensitive structure includes a rupturable container, retaining the alkaline processing composition having the first pH and opacifying agent, fixedly positioned extending transverse a leading edge of the composite structure in order to effect, upon application of compressive pressure to the container, discharge of the processing composition intermediate the opposed surfaces of the reception layer and the next adjacent silver halide emulsion.

The liquid processing composition, distributed intermediate the reception layer and the silver halide emulsion, permeates the silver halide emulsion layers of the composite photosensitive structure to initiate development of the latent images contained therein resultant from photoexposure. As a consequence of the development of the latent images, dye image-providing material associated with each of the respective silver halide emulsion layers is individually mobilized as a function of the point-to-point degree of the respective silver halide emulsion layer's photoexposure, resulting in imagewise distributions of mobile dye image-providing materials adapted to transfer, by diffusion, to the reception layer to provide the desired transfer dye image. Subsequent to substantial dye image formation in the reception layer, a sufficient portion of the ions of the alkaline processing composition transfers, by diffusion, to the polymeric neutralizing layer to effect reduction in the alkalinity of the composite film unit to the second pH at which dye image-providing material is substantially nondiffusible, and further dye image-providing material transfer is thereby substantially obviated.

The transfer dye image is viewed, as a reflection image, through the dimensionally stable transparent layer against the background provided by the opacifying agent, distributed as a component of the processing composition, intermediate the reception layer and next adjacent silver halide emulsion layer. The thus-formed opacifying stratum effectively masks residual dye image-providing material retained in association with the silver halide emulsion layer subsequent to processing.

In my U.S. patent application Ser. No. 638,817, filed May 16, 1967, now U.S. Patent No. 3,415,646, the dimensionally stable layer of the film unit next adjacent the photosensitive silver halide layer or layers is disclosed to be transparent to incident actinic radiation and as disclosed in my U.S. patent application Ser. No. 622,298, filed Mar. 10, 1967, now U.S. Patent No. 3,415,645, in such instance the opacifying agent may be initially disposed in the film unit intermediate the reception layer and next adjacent silver halide layer.

As disclosed in my copending U.S. patent application Ser. No. 846,441, filed July 31, 1969, now U.S. Patent No. 3,615,421 and the copending U.S. patent application Ser. No. 3,646 of Sheldon A. Buckler, filed Jan. 19, 1970, now abandoned, the opacifying component of the film unit may optionally be initially disposed as a preformed processing composition permeable layer, intermediate the reception layer and next adjacent silver halide layer, in a concentration which prior to photoexposure is insufficient to prevent transmission therethrough of exposing actinic radiation and which, subsequent to processing, possesses an opacifying capacity effective to mask residual dye image-providing material retained associated with the film unit's silver halide emulsion layers, and in my copending U.S. patent application Ser. No. 43,742, filed June 5, 1970, and now U.S. Patent 3,647,435, the opacifying component of the film unit may optionally be initially formed in situ, intermediate the reception layer and next adjacent silver halide layer, during photographic processing of the film unit.

In my copending U.S. patent application Ser. No. 786,352, filed Dec. 23, 1968, now abandoned, the opacifying component is disclosed to optionally comprise a light-absorbing reagent such as a dye which is present as an absorbing species at the first pH and which may be converted to a substantially non-absorbing species at the second pH.

In my copending U.S. patent application Ser. No. 782,056, filed Dec. 9, 1968, now U.S. Patent No. 3,573,043, the polymeric neutralizing layer is disclosed to be optionally disposed intermediate the dimensionally stable opaque layer and next adjacent essential layer, i.e., next adjacent silver halide/dye image-providing material component, to effect the designated modulation of film unit's environmental pH, and my copending U.S. patent application Ser. No. 846,442, filed July 31, 1969, now U.S. Patent No. 3,576,625, disclosing the employment of particulate acid distributed within the film unit to effect the modulation of the environmental pH.

SUMMARY OF THE INVENTION

The present invention is directed to a new and improved integral negative/positive diffusion transfer process photographic film unit adapted to provide, by diffusion transfer processing, reflection print photographic image reproduction as a function of exposure of such film unit to incident actinic radiation.

The film unit assemblage construction to be employed in the practice of the present invention comprises a film unit of the general type set forth in my aforementioned U.S. Patents Nos. 3,415,644, –5 and –6 and copending U.S. patent applications Ser. Nos. 782,056; 786,352; 846,441; 846,442; and 43,742, and will comprise, in essence, a composite photosensitive element which includes a plurality of layers including, in relative order, a dimensionally stable layer preferably opaque to incident actinic radiation; one or more photosensitive silver halide layers having associated therewith dye image-forming material which is processing composition diffusible as a function of the point-to-point degree of silver halide layer exposure to incident actinic radiation; a layer adapted to receive image-forming material diffusing thereto; a dimensionally stable layer transparent to incident actinic radiation; means for interposing, intermediate the silver halide layers and the reception layer, opacifying agent and a processing composition possessing a first pH at which the dye image-forming material is diffusible during processing; and preferably additionally includes means for modulating the pH of the film unit from the first pH to a second pH at which the dye image-forming material is substantially nondiffusible subsequent to substantial dye transfer image formation.

In accordance with a preferred embodiment of the present invention, a film unit assemblage of the aforementioned general structural parameters and adapted to be processed, subsequent to photoexposure, in the presence of actinic radiation will be fabricated to employ, as the opacifying means interposed intermediate the reception layer and next adjacent silver halide layer subsequent to photoexposure, an inorganic light-reflecting pigment dispersion containing reflecting pigment and at least one optical filter agent, at a pH above the pKa of the optical filter agent and at which pH the dye image-forming material is diffusible during processing as a function of silver halide layer photoexposure, in a concentration in admixture effective to provide a barrier to transmission of actinic radiation therethrough, and wherein the means for interposing the light-reflecting pigment dispersion and the processing composition comprises a rupturable container, retaining the pigment dispersion disposed in the processing composition selected, fixedly poitioned extending transverse a leading edge of the film unit and adapted, upon application of compressive pressure, to distribute its contents intermediate the reception layer and next adjacent silver halide layer.

BRIEF DESCRIPTION OF THE DRAWINGS

FIG. 1 is a perspective view of a photographic film unit embodying the invention;

FIGS. 2, 4 and 6 are diagrammatic enlarged cross-sectional views of the film unit of FIG. 1, along section line 2—2, illustrating the association of elements during the three illustrated stages of the performance of a diffusion transfer process, for the production of a multicolor transfer image according to the invention, the thickness of the various materials being exaggerated, and wherein FIG. 2 represents an exposure stage, FIG. 4 represents a processing stage and FIG. 6 represents a product of the process; and FIGS. 3, 5 and 7 are diagrammatic, further enlarged cross-sectional views of the film units of FIGS. 2, 4 and 6, along section lines 3—3, 5—5 and 7—7, respectively, further illustrating, in detail, the arrangement of layers comprising the photosensitiv laminate during the three illustrated stages of the transfer process.

DETAILED DESCRIPTION OF THE INVENTION

Figure 4:
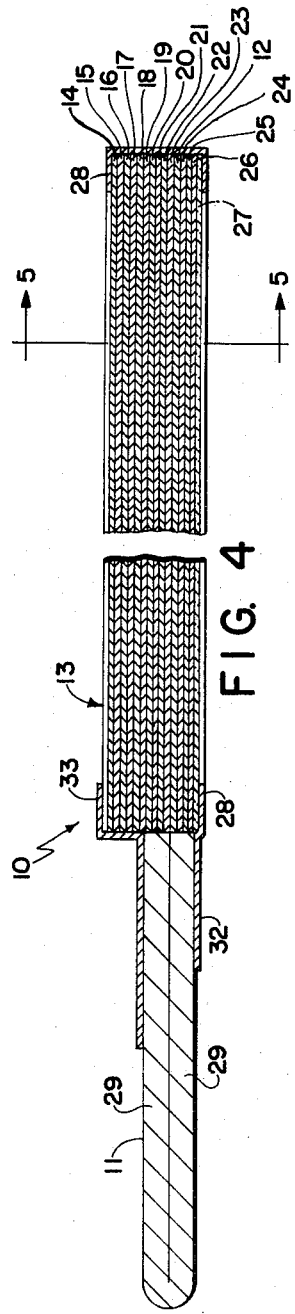
Figure 5:
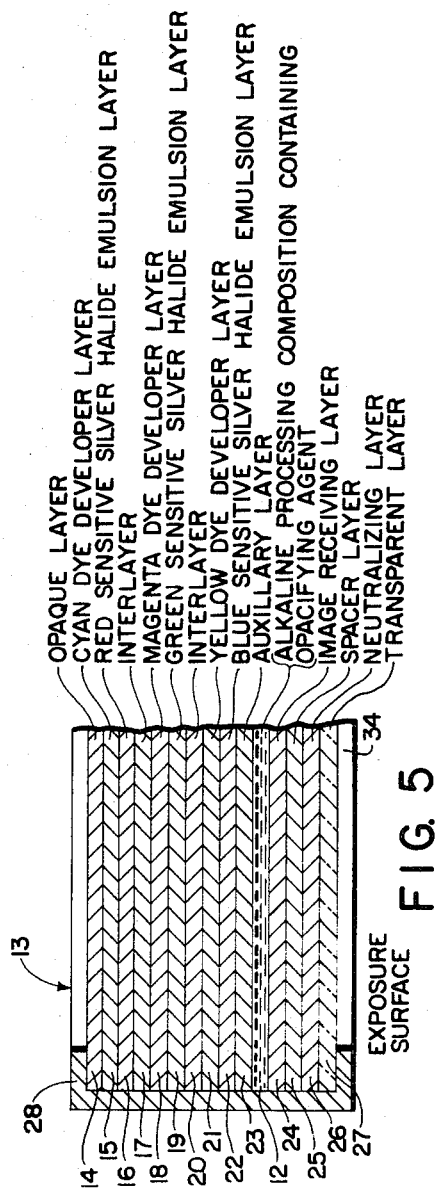
Figure 6:
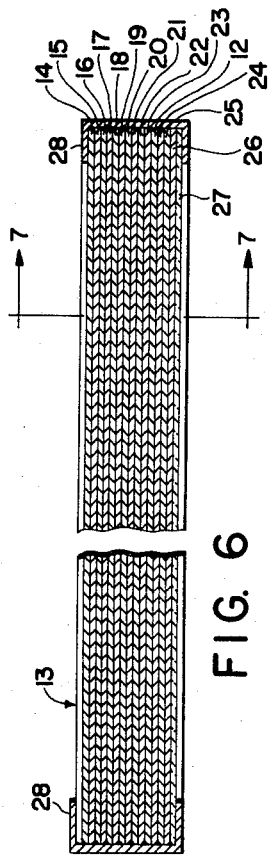
Figure 7:
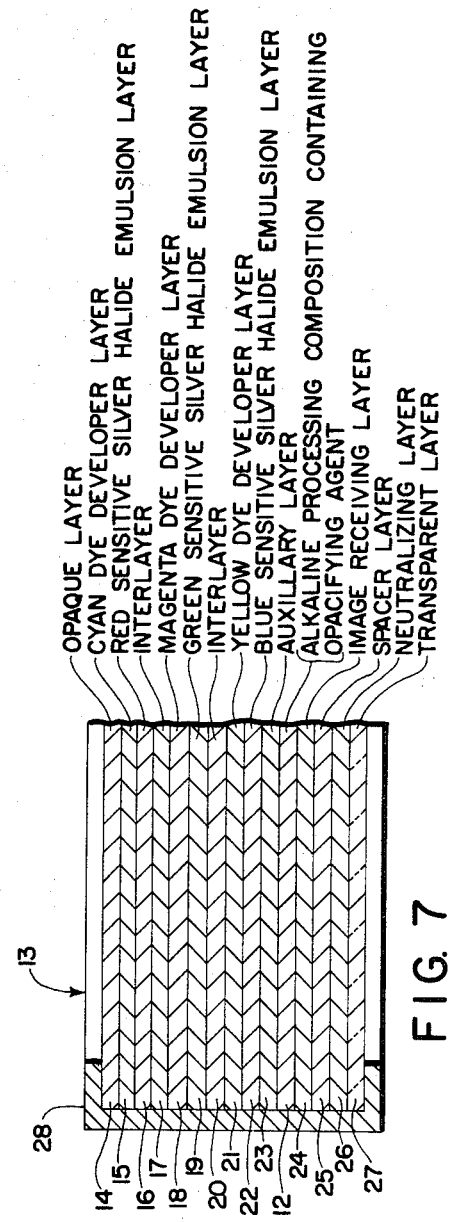

It has been found that if an image-receiving element is maintained in contact with the photosensitive element, subsequent to dye developer transfer image formation, as disclosed in U.S. Pat. No. 2,983,606, and includes the presence of an alkaline processing composition, necessarily having a pH at which dye, for example, in reduced form, diffuses to form the dye transfer image, intermediate the elements, the transfer image thus formed is unstable over an extended period of time. The dye image instability is due, at least in part to the presence of what is, in general, a relatively high pH alkaline composition in intimate contact with the dye or dyes forming the image. This contact itself provides instability to the molecular structure of dye by, for example, catalyzing degradation and undesirable structural shifts effecting the spectral absorption characteristics of the image dye. In addition, the presence of an alkaline composition, possessing a pH at which the dye, for example, in reduced form, diffuses, also provides an integral dynamic system wherein oxidized dye, immobilized in areas of the photosensitive element, as a function of its development, with the passage of time attempts to generate, in such areas, an equilibrium between oxidized and reduced dye. In that the pH of the dynamic system is such that diffusion of the reduced form of the dye will occur, such reduced dye will, at least in part, transfer to the image-receiving layer and the resultant diffusion will imbalance the equilibrium, in such areas of the photosensitive element, in favor of additional formation of reduced dye. As a function of the efficiency of the image-receiving layer, as a dye sink, such nonimagewise dyeing of the image-carrying layer stall further imbalances the equilibrium in favor of the additional formation of dye in reduced, diffusible form. Under such circumstances, the transfer image definition, originally carried by the image-receiving layer, will suffer a continuous decrease in the delta between the image's maximum and minimum densities and may, ultimately, result in the image-receiving element's loss of all semblance of image definition; merely becoming a polymeric stratum carrying a relatively uniform overall dyeing.

Any attempt to decrease the dye sink capacity of the image-carrying layer, for example, by reduction of its mordant capacity, in order to alleviate, at least to an extent, the action of the image-receiving layer as a dye sink, however, will enhance diffusion of the dye, comprising the transfer image, from the image-carrying layer, to the remainder of the element due, at least in part, to the continued presence of the alkaline composition having a pH at which the reduced form of the dye, forming the transfer image, is diffusible. The ultimate result is substantially the same overall image distortion as occurs when the image-receiving layer acts as a dye sink, with the exception that the dye is more extensively distributed throughout the film unit and the ultimate overall dyeing of the image-receiving layer itself is of lower saturation.

The problems inherent in fabricating a film unit of the type wherein the image-receiving element, the alkaline processing composition and the photosensitive element are maintained in contiguous contact subsequent to dye transfer image formation, for example, a film unit of the type described hereinbefore with reference to aforementioned U.S. Pat. No. 2,983,606, may be effectively obviated by fabrication of a film unit in accordance with the physical parameters specifically set forth herein.

As previously characterized, diffusion transfer photographic processing may be employed to provide a positive reflection dye image, which possesses substantial advantages over the dye image provided by the prior art systems and techniques including the obviation of the aforementioned disadvantages of the prior art systems, as a direct function of actinic radiation incident on a film unit assemblage specifically constructed to comprise, in essence, a plurality of sequential layers including a dimensionally stable layer preferably opaque to incident radiation; a photosensitive silver halide layer having associated therewith dye image-forming material which is processing composition diffusible at a selected first pH as a function of the point-to-point degree of silver halide layer photoexposure; a layer adapted to receive dye image-forming material diffusing thereto; a dimensionally stable layer transparent to incident radiation; means for interposing, intermediate the silver halide layer and the reception layer, opacifying agent and preferably an inorganic reflecting pigment dispersion containing at least one optical filter agent or dye in a concentration effective to provide, subsequent to selective photoexposure of the silver halide layer, protection of the silver halide layer from further exposure to actinic radiation incident on the dimensionally stable layer; and preferably also means for converting the pH of the film unit from the first pH to a second pH at which the dye image-forming material is substantially nondiffusible subsequent to substantial dye image-forming material diffusion to the reception layer. In accordance with the present invention, one of the dimensionally stable layers possesses a processing composition solvent vapor permeability sufficient to effect, subsequent to substantial dye transfer image formation and preceding substantial dye transfer image degradation, osmotic transpiration of processing composition solvent in a quantity effective to decrease a first solvent concentration at which the dye image-forming material is soluble and diffusible as a function of processing to a second solvent concentration at which the dye image-forming material is substantially nondiffusible; and the other of said dimensionally stable layers is relatively impervious to solvent vapor, i.e., possesses a solvent vapor permeability on the order of from 0 to about 15% of the permeability of the vapor permeable dimensionally stable layer. The realtively impervious dimensionally stable layer is preferably selected so as to provide increased rigidity and resistance to distortion of the film unit, as will be discussed in more detail hereinafter.

In a preferred embodiment of the present invention, the means for interposing the processing composition selected intermediate the reception layer and the silver halide layer comprises a rupturable container retaining a processing composition comprising the solvent and pH concentrations required fixedly positioned and extending transverse a leading edge of the film unit to effect, upon application of compressive pressure, discharge of the processing composition intermediate the reception layer and the photosensiitve silver halide layer next adjacent. In such embodiment the opacifying agent is preferably disposed within the processing composition, as retained in the rupturable container, for distribution as a component of such composition intermediate the reception and silver halide layers, subsequent to selective exposure of the film unit.

Multicolor images may be obtained using color image-forming components in the diffusion transfer process of the present invention by several techniques. One such technique contemplates obtaining multicolor transfer images utilizing, for example, dye developers as dye image-providing materials by employment of an integral multilayer photosensitive element, such as disclosed in my aforementioned U.S. Pat. No. 3,415,644 wherein at least two selectively sensitized photo-sensitive strata, superposed on a single support, are processed, simultaneously and without separation, with a single, common image-receiving layer. A suitable arrangement of this type comprises the opaque support carrying a red-sensitive silver halide stratum, a green-sensitive silver halide stratum and a blue-sensitive silver halide stratum, said emulsions having associated therewith, respectively, for example, a cyan dye developer, a magenta dye developer and a yellow dye developer. The dye developer may be utilized in the silver halide stratum, for example, in the form of particles, or it may be employed as a layer behind the appropriate silver halide strata. Each set of silver halide strata and associated dye developer strata are disclosed to be optionally separated from other sets by suitable interlayers, for example, by a layer of gelatin or polyvinyl alcohol. In certain instances, it may be desirable to incorporate a yellow filter in front of the green-sensitive emulsion and such yellow filter may be incorporated in an interlayer. However, where desirable, a yellow dye developer of the appropriate spectral characteristics and present in a state capable of functioning as a yellow filter may be employed. In such instances, a separate yellow filter may be omitted.

In a preferred embodiment of the present invention, the film unit is specifically adapted to provide for the production of a multicolor dye transfer image and the photosensitive laminate comprises, in order of essential layers, the dimensionally stable opaque layer; at least two selectively sensitized silver halide strata each having dye image-providing material of predetermined color associated therewith, for example, dye developers as detailed above, which are soluble and diffusible in processing composition as a function of the point-to-point degree of exposure of the respective associated silver halide stratum; a polymeric layer dyeable by the dye image-providing materials; and a dimensionally stable transparent layer, In view of the fact that the preferred dye image-providing materials comprise dyes which are silver halide developing agents, as stated above, for purposes of simplicity and clarity, the present invention will be further described hereinafter in terms of such dyes, without limitation of the invention to the illustrative dyes denoted, and, in addition the photographic film unit structure will be detailed hereinafter employing the last-mentioned preferred structural embodiment, without limitation of the invention to the preferred structure denoted.

The dye developers, as noted above, are compounds which contain, in the same molecule, both the chromophoric system of a dye and also a silver halide developing function. By "a silver halide developing function" is meant a grouping adapted to develop exposed silver halide. A preferred silver halide development function is a hydroquinonyl group. Other suitable developing functions include ortho-dihydroxyhenyl and ortho- and para- amino substituted hydroxyphenyl groups. In general, the development function includes a benzenoid developing function, that is, an aromatic developing group which forms quinonoid or quinone substances when oxidized.

The dye developers are preferably selected for their ability to provide colors that are useful in carrying out subtractive color photography, that is, the previously mentioned cyan, magenta and yellow. The dye developers employed may be incorporated in the respective silver halide emulsion or, in the preferred embodiment, in a separate layer behind the respective silver halide stratum. Specifically, the dye developer may, for example, be in a coating or layer behind the respective silver halide stratum and such a layer of dye developer may be applied by use of a coating solution containing about 0.5 to 8%, by weight, of the respective dye developer distributed in a film-forming natural, or synthetic, polymer, for example, gelatin, polyvinyl alcohol, and the like, adapted to be permeated by the chosen diffusion transfer fluid processing composition.

The silver halide strata comprising the multi-color photosensitive laminate preferably predominant spectral sensitivity to separate regions of the spectrum and each has associated therewith a dye which is a silver halide developing agent and is, most preferably substantially soluble in the reduced form only at a first pH possessing, subsequent to processing, a spectral absorption range substantially complementary to the predominant sensitivity range of its associated emulsion.

In the preferred embodiment, each of the silver halide strata, and its associated dye, is separated from the remaining strata, and their associated dye, by separate alkaline solution permeable polymeric interlayers.

In such preferred embodiment of the invention, the silver halide strata comprises photosensitive silver halide dispersed in gelatin and are about 0.6 to 6 microns in thickness; the dye itself is dispersed in an aqueous alkaline solution polymeric binder, preferably gelatin, as a separate layer about 1 to 7 microns in thickness; the alkaline solution permeable polymeric interlayers, preferably gelatin, are about 1 to 5 microns in thickness; the dyeable polymeric layer is transparent and about 0.25 to 0.4 mil. in thickness; and each of the dimensionally stable opaque and transparent layers are alkaline solution impermeable, processing composition vapor permeable and about to 6 mils. in thickness. It will be specifically recognized that the relative dimensions recited above may be appropriately modified, in accordance with the desires of the operator, with respect to the specific product to be ultimately prepared.

Although in point of fact, the diamensionally stable layer employed in the practice of the present invention, which is vapor permeable to provide the desired osmotic transpiration, may possess a vapor transmission rate of 1 or less gms./24 hrs./100 in.²/mil., in a preferred embodiment of the present invention, it will possess a vapor transmission rate for the selected processing composition solvent averaging not less than about 100 gms./24 hrs./100 in.²/mil., most preferably in terms of the preferred solvent, water, a vapor transmission rate averaging in excess of about 300 gms. of water/24 hrs./100 in.²/mil., and may advantageously comprise a microporous polymeric film possessing a pore distribution which does not unduly interfere with the dimensional stability of the layer or, where required, the optical characteristics of the layer. Such pore distribution may comprise, for example, an average pore diameter of from $<\sim$ 20 microns to $>\sim$ 100 microns and a pore volume of $<\sim$ 3% to $>\sim$ 7%.

In a particularly preferred embodiment of the present invention, the preferred solvent, water, may be employed in a weight/weight ratio of about 1:10 to 1:20 dye to water at a ratio of about 1:30 to 1:10 liquid permeable polymer to water and most preferably will be fabricated to comprise about 300 to 1300 mgs./ft.² liquid permeable polymeric binder material, about 200 to 400 mgs./ft.² dye and about 5000 mgs./ft.² water.

As was mentioned previously, the other dimensionally stable layer is relatively vapor impervious and accordingly, the osmotic transpiration to decrease the solvent concentration to one at which the dye image-forming material is substantially non-diffusible occurs mainly only through one of the dimensionally stable layers.

The dimensionally stable layers are designed so that there is no liquid flow through the layers. The operational efficiency of the film unit is directly dependent upon the nature and quality of the vapor permeable membrane characteristics of the vapor permeable layer selected. The vapor transmission characteristics desired are directed to maximization of the rate at which the required quantity of processing solvent is effectively evacuated from the film unit subsequent to substantial dye transfer image formation by diffusion transfer processing, commensurate with maintaining the liquid impermeability and dimensional stability characteristics of the layers. Thus, the vapor permeable layer should possess the maximum vapor transmission capacity which permits the passage of processing composition solvent vapor, and any gas dissolved herein, at its vapor pressure, without allowing passage of fluid processing composition. The layer employed for this purpose, therefore, should be as thin as possible for solvent vapor transmission efficiency yet retain sufficient strength to provide stability to and resist chemical and physical degradation of the film unit under conditions of use.

In the preferred embodiment of the present invention's film unit for the production of a muticolor transfer image, the respective silver halide/dye developer units of the photosensitive element will be in the form of a tripack configuration which will ordinarily comprise a cyan dye developer/red-sensitive emulsion unit contiguous the dimensionally stable opaque layer, the yellow dye developer/blue-sensitive emulsion unit most distant from the opaque layer and the magenta dye developer/green-sensitive emulsion unit intermediate those units, recognizing that the relative order of such units may be varied in accordance with the desires of the operator.

Reference is now made to FIGS. 1 through 7 of the drawings wherein there is illustrated a preferred film unit of the present invention and wherein like numbers, appearing in the various figures, refer to like components.

As illustrated in the drawings, FIG. 1 sets forth a perspective view of the film unit, designated 10, and each of FIG. 2 through 7 illustrate diagrammatic cross-sectional views of film unit 10, along the stated section lines 2—2, 3—3, 5—5 and 7—7, during the various depicted stages in the performance of a photographic diffusion transfer process as detailed hereinafter.

Film unit 10 comprises rupturable container 11, retaining, prior to processing, aqueous processing compsition 12, and photosensitive laminate 13 including, in order, dimensionally stable opaque layer 14, preferably an actinic radiation-opaque flexible sheet material; cyan dye developer layer 15; red-sensitive silver halide emulsion layer 16; interlayer 17; magenta dye developer layer 18; green-sensitive silver halide emulsion layer 19; interlayer 20, yellow dye developer layer 21; blue-sensitive silver halide emulsion layer 22; auxiliary layer 23, which may contain an auxiliary silver halide developing agent; image-receiving layer 24; spacer layer 25; neutralizing layer 26; and dimensionally stable transparent layer 27, preferably an actinic radiation transmissive flexible sheet material.

The structural integrity of laminate 13 may be maintained, at least in part, by the adhesive capacity exhibited between the various layers comprising the laminate at their opposed surfaces. However, the adhesive capacity exhibited at an interface intermediate image-receiving layer 24 and the silver halide emulsion layer next adjacent thereto, for example, image-receiving layer 24 and auxiliary layer 23 as illustrated in FIGS. 2 through 7, should be less than that exhibited at the interface between the opposed surfaces of the remainder of the layers forming the laminate, in order to facilitate distribution of processing solution 12 intermediate the stated image-receiving layer 24 and the silver halide emulsion layer next adjacent thereto. The laminate's structural integrity may also be enhanced or provided, in whole or in part, by providing a binding member extending around, for example, the edges of laminate 13, and maintaining the layers comprising the laminate intact, except at the interface between layers 23 and 24 during distribution of processing composition 12 intermediate those layers. As illustrated in the figures, the binding member may comprise a pressure-sensitive tape 28 securing and/or maintaining the layers of laminate 13 together at its respective edges. Tape 28 will also act to maintain processing solution 12 intermediate image-receiving layer 24 and the silver halide emulsion layer next adjacent thereto, upon application of compressive pressure to pod 11 and distribution of its contents intermediate the stated layers. Under such circumstances, binder tape 28 will act to prevent leakage of fluid processing composition from the film unit's laminate during and subsequent to photographic processing.

Rupturable container 11 may be of the type shown and described in any of U.S. Patents Nos. 2,543,181; 2,634,886; 3,653,732; 2,723,051; 3,056,492; 3,056,491; 3,152,515; and the like. In general, such containers will comprise a rectangular blank of fluid- and air-impervious sheet material folded longitudinally upon itself to form two walls 29 which are sealed to one another along their longitudinal and end margins to form a cavity in which processing composition 12 is retained. The longitudinal marginal seal 30 is made weaker than the end seals 31 so as to become unsealed in response to the hydraulic pressure generated within the fluid contents 12 of the container by the application of compressive pressure to walls 29 of the container.

As illustrated in FIGS. 1, 2 and 3, container 11 is fixedly positioned and extends transverse a leading edge of photosensitive laminate 13 whereby to effect unidirectional discharge of the container's contents 12 between image-receiving layer 24 and the stated layer next adjacent thereto, upon application of compressive force to container 11. Thus, container 11, as illustrated in FIG. 2, is fixedly positioned and extends transverse a leading edge of laminate 13 with its longitudinal marginal seal 30 directed toward the interface between image-receiving layer 24 and auxiliary layer 23. As shown in FIGS. 1, 2 and 4, container 11 is fixedly secured to laminate 13 by extension 32 of tape 28 extending over a portion of one wall 29 of the container, in combination with a separate retaining member such as illustrated retaining tape 33 extending over a portion of laminate 13's surface generally equal in area to about that covered by tape 28.

As illustrated in FIGS. 1, 2 and 4, extension flap 32 of tape 28 is preferably of such area and dimensions that upon, for example, manual separation of container 11 and tape 33, subsequent to distribution of processing composition 12, from the remainder of film unit 10, flap 32 may be folded over the edge of laminate 13, previously covered by tape 33, in order to facilitate maintenance of the laminate's structural integrity, for example, during the flexations inevitable in storage and use of the processed film unit, and to provide a suitable mask or frame, for viewing of the transfer image through the picture viewing area of transparent layer 27.

The fluid contents of the container preferably comprise an aqueous alkaline solution having a pH and solvent concentration at which the dye developers are soluble and diffusible and contains inorganic light-reflecting pigment and at least one optical filter agent at a pH above the pKa of such agent in a quantity sufficient, upon distribution, effective to provide a layer exhibiting optical transmission density 6.0 and optical reflection density 1.0 to prevent exposure of photosensitive silver halide emulsion layers 16, 19 and 22 by actinic radiation incident on dimensionally stable transparent layer 27 during processing in the presence of such radiation and to afford immediate viewing of dye image formation in image-receiving layer 24 during and subsequent to dye transfer image formation. Accordingly, the film unit may be processed, subsequent to distribution of the composition, in the presence of such radiation, in view of the fact that the silver halide emulsion or emulsions of laminate are appropriately protected by incident radiation, at one major surface of the opaque processing composition and at the remaining major surface by the dimensionally stable opaque layer. If the illustrated binder tapes are also opaque, edge leakage of actinic radiation incident on the emulsion or emulsions will also be prevented.

The selected reflecting pigment should be one providing a background suitable for viewing the dye developer transfer image formed in the dyeable polymeric layer. In general, while substantially any reflecting agent may be employed, it is preferred that a reflecting agent be selected that will not interfere with the color integrity of the dye transfer image, as viewed by the observer, and, most preferably, an agent which is aesthetically pleasing to the viewer and does not provide a background noise signal degrading, or detracting from the information content of the image. Particularly desirable reflecting agents will be those providing a white background, for viewing the transfer image, and specifically those conventionally employed to provide background for reflection photographic prints and, especially those agents possessing the optical properties desired for reflection of incident radiation.

As examples of reflecting pigments adapted for employment in the practice of the present invention, mention may be made of barium sulfate, zinc sulfide, titanium dioxide, barium stearate, silver flake, silicates, alumina, zirconium oxide, zirconium acetyl acetate, sodium zirconium sulfate, kaolin, mica, and the like.

A particularly preferred reflecting agent comprises titanium dioxide due to its highly effective reflection properties. In general, in such preferred embodiment, based upon percent titanium dioxide (weight/volume) a processing composition containing about 1500 to 4000 mgs./ft.$^2$ titanium dioxide dispersed in 100 cc. of water will provide a percent reflectance of about 85 to 90%. In the most preferred embodiments, the percent reflectance particularly desired will be in the order of $>\sim 85\%$.

In embodiments wherein the dispersion comprises a preformed layer positioned intermediate the reception layer and next adjacent silver halide layer, the pigment layer will be sufficiently transparent to allow transit of exposing radiation through the pigment layer and may comprise titanium dioxide reflecting agent possessing a particle size distribution averaging $<\sim 0.2$ micron in diameter and preferably $<\sim 0.05$ micron in diameter as initially present preceding exposure of the film unit, which preferred materials, upon contact with aqueous alkaline processing composition, preferably aggregate to provide particles possessing a diameter $>\sim 0.2$ micron in diameter and will be coated at a coverage of ~200 to 1000 mgs./ft.² Specifically, the reflecting agent will be present in a quantity insufficient to prevent exposure of the emulsion layers by actinic radiation incident on the dimensionally stable transparent layer of the film unit but in a concentration sufficient, subsequent to processing, to mask dye developer associated with the silver halide emulsion strata from the dye transfer image. In the preferred construction of such embodiment, the pigment such as titanium dioxide will be initially present in a relatively small particle size to provide unexpectedly efficient transit of radiation through the reflecting layer during exposure which upon contact with an alkaline processing composition and aggregation of the pigment particles provides efficient light reflectivity and masking capacity subsequent to such aggregation.

In general, the reflecting agents to be employed are those which remain substantially immobile within their respective compositions during and subsequent to photographic processing and particularly those which comprise insoluble and nondiffusible inorganic pigment dispersions within the layer in which they are disposed.

Where desired, reflecting agent pigment may thus be distributed in whole or in part within a processing composition permeable polymeric matrix such as gelatin and/ or any other such polymeric matrixes as are specifically denoted throughout the specification as suitable for employment as a matrix binder and may be distributed in one or more of the film unit layers which may be separated or contiguous, intermediate the image-receiving layer and next adjacent silver halide layer, provided that its distribution and concentration is effective to provide the denoted post processing masking function, and/or in whole or in part the reflecting agent may be ultimately disposed within the processing composition residuum located intermediate the image-receiving layer and next adjacent silver halide emulsion strata and associated dye image-forming material.

The optical filter agent selected should be one exhibiting, at a pH above its pKa, maximum spectral absorption of radiation at the wavelengths to which the film unit's photosensitive silver halide layer or layers are sensitive and should be substantially immobile or nondiffusible within the pigment dispersion, during performance of its radiation filtration function, in order to maintain and enhance the optical integrity of the dispersion as a radiation filter unit functioning in accordance with the present invention, and to prevent its diffusion into and localized concentration within the image-receiving layer thereby decreasing the efficiency of the reflecting pigment dispersion as a background against which image formation may be immediately viewed, during the initial stages in the diffusion transfer processing of the film unit, by filter agent absorption of dispersion reflected visible radiation prior to reduction in the environmental pH below the pKa of the agent. Commensurate with the spectral sensitivity range of the associated silver halide layer or layers, the optical filter agent selected may comprise one or more filter dyes possessing absorption complementary to such silver halide layers in order to provide effective protection against physical fog providing radiation during processing. Recognizing that the filter agent absorption will derogate from image-viewing characteristics by contaminating reflecting pigment background, the selected agents should be those exhibiting major spectral absorption at the pH at which processing is effected and minimal absorption at a pH below that which obtains during transfer image formation. Accordingly, the selected optical filter agent or agents should possess a pKa below that of the processing pH and above that of the environmental pH subsequent to transfer image formation, and will be preferably selected for employment in the minimum concentration necessary to provide an optical transmission density $>\sim 6.0$, at wavelengths at which the silver halide layer is maximally responsive, and an optical reflection density $<\sim 1.0$ at such wavelengths.

As specific examples of such pH-sensitive optical filter agents adapted for employment in the practice of the present invention, reference is directed to the agents set forth in my copending U.S. patent application Ser. No. 43,782, filed June 5, 1970, now abandoned, incorporated herein by reference.

In general, preferred agents, both opacifying and filter, are those which remain immobile within their respective compositions during and subsequent to photographic processing and particularly those which comprise insoluble and nondiffusible materials.

As disclosed in the previously cited patents, the liquid processing composition referred to for effecting multicolor diffusion transfer processes comprises at least an aqueous solution of an alkaline material, for example, diethylamine, sodium hydroxide or sodium carbonate and the like, and preferably possessing a pH in excess of 12, and most preferably includes a viscosity-increasing compound constituting a film-forming material of the type which, when the composition is spread and dried, forms a relatively firm and relatively stable film. The preferred film-forming materials disclosed comprise high molecular weight polymers such as polymeric, water-soluble ethers which are inert to an alkaline solution such as, for example, a hydroxyethyl cellulose or sodium carboxymethyl cellulose. Additionally, film-forming materials or thickening agents whose ability to increase viscosity is substantially unaffected if left in solution for a long period of time are also disclosed to be capable of utilization. As stated, the film-forming material is preferably contained in the processing composition in such suitable quantities as to impart to the composition a viscosity in excess of 100 cps. at a temperature of approximately 24° C. and preferably in the order of 100,000 cps. to 200,000 cps. at that temperature.

In the performance of a diffusion transfer multicolor process employing film unit 10, the unit is exposed to radiation, actinic to photosensitive laminate 13, incident on the laminate's exposure surface 34, as illustrated in FIG. 2.

Subsequent to exposure, as illustrated by FIGS. 2 and 4, film unit 10 is processed by being passed through opposed suitably gapped rolls 35 in order to apply compressive pressure to frangible container 11 and to effect rupture of longitudinal seal 30 and distribution of alkaline processing composition 12, possessing inorganic light-reflecting pigment and optical filter agent at a pH above the pKa of the filter agent and a pH at which the cyan, magenta and yellow dye developers are soluble and diffusible as a function of the point-to-point degree of exposure of red-sensitive silver halide emulsion layer 16, green-sensitive silver halide emulsion layer 19 and blue-sensitive silver halide emulsion layer 22, respectively, intermediate reflecting agent precursor layer 25 and auxiliary layer 23.

Alkaline processing composition 12 permeates emulsion layers 16, 19 and 22 to initiate development of the latent images contained in the respective emulsions. The cyan, magenta and yellow dye developers, of layers 15, 18 and 21, are immobilized, as a function of the development of their respective associated silver halide emulsions, preferably substantially as a result of their conversion from the reduced form to their relatively insoluble and non diffusible oxidized form, thereby providing imagewise distributions of mobile, soluble and diffusible cyan, magenta and yellow dye developer, as a function of the point-to-point degree of their associated emulsions' exposure. At least part of the imagewise distributions of mobile cyan, magenta and yellow dye developer transfers, by diffusion, to dyeable polymeric layer 24 to provide a multicolor dye transfer image to that layer which is viewable against the background provided by the reflecting pigment present in processing compositions residuum 12 masking cyan, magenta and yellow dye developer remaining associated with blue-sensitive emulsion layer 22, green-sensitive emulsion layer 19 and red-sensitive emulsion layer 16. Subsequent to substantial transfer image formation, a sufficient portion of the ions comprising aqueous alkaline processing composition 12 transfer, by diffusion, through permeable polymeric reception layer 24, permeable spacer layer 25 to polymeric neutralizing layer 26 whereby the environmental pH of the system decreases as a function of neutralization to a pH at which the cyan, magenta and yellow dye developers, in the reduced form, are substantially non-diffusible to thereby provide a stable multicolor dye transfer image and discharge of the pH-sensitive optical filter agent by reduction of the pH substantially below the pKa of such agent to thereby provide maximum reflectivity in terms of the pigment concentration present.

The alkaline solution component of the processing composition, positioned intermediate the photosensitive element and the image-receiving layer, thus permeates the emulsions to initiate development of the latent images contained therein. The respective associated dye developers are mobilized in unexposed areas as a consequence of the development of the latent images. This mobilization is apparently, at least in part, due to a change in the solubility characteristics of dye developer upon oxidation and especially as regards it solubility in alkaline solutions. It may also be due in part to a tanning effect on the emulsion by oxidized developing agent, and in part to a localized exhaustion of alkali as a result of development. In unexposed and partially exposed areas of the emulsions, the associated dye developer is diffusible and thus provides an imagewise distribution of unoxidized dye developer dissolved in the liquid processing composition, as a function of the point-to-point degree of exposure of the silver halide emulsion. At least part of this imagewise distribution of unoxidized dye developer is transferred, by imbibition, to a superposed image-receiving layer or element, said transfer substantially excluding oxidized dye developer. The image-receiving layer or element, said transfer substantially excluding oxidized dye developer. The image-receiving element receives a depthwise diffusion, from the developed emulsion, of unoxidized dye developer without appreciably disturbing the imagewise distribution thereof to provide the reversed or positive color image of the developed image.

Subsequent to distribution of processing composition 12, container 11 may be manually dissociated from the remainder of the film unit, as described above, to provide the product illustrated in FIG. 6.

The present invention will be further illustrated and detailed in conjunction with the following illustrative constructions which set out representative embodiments and photographic utilization of the novel phototgraphic film units of this invention, which, however, are not limited to the details therein set forth and are intended to be illustrative only.

Film units similar to that shown in the drawings may be prepared, for example, by coating, in sucession, on the coated surface of a 5 mil. opaque cellulose triacetate film base possessing a water vapor permeability of 324 gms. of water/24 hrs./100 in.²/mil., coated with a thin layer (less than 0.1 mil) of polyvinylidene chloride, the following layers:

(1) A layer of the cyan dye developer 1,4-bis-($\beta$-[hydroquinonyl-$\alpha$-methyl] - ethylamino) - 5,8 - dihydroxyanthraquinone dispersed in gelatin and coated at a coverage of about 80 mgs./ft.² of dye and about 100 mgs./ft.² of gelatin;

(2) A red-sensitive gelatin-silver iodobromide emulsion coated at a coverage of about 225 mgs./ft.² of silver and about 50 mgs./ft.² of gelatin;

(3) A layer of the acrylic latex sold by Rohm and Haas Co., Philadelphia, Pa., U.S.A., under the trade designation AC–61 and polyacrylamide coated at a coverage of about 150 mgs./ft.² of AC–61 and about 5 mgs./ft.² of polyacrylamide;

(4) A layer of the magenta dye developer 2-(p-[$\beta$-hydroquinonylethyl]-phenylazo) - 4 - isopropoxy-1-naphthol dispersed in gelatin and coated at a coverage of 70 mgs./ft.² of dye and about 120 mgs./ft.² of gelatin;

(5) A green-sensitive gelatino-silver iodobromide emulsion coated at a coverage af about 120 mgs./ft.² of silver and 60 mgs./ft.² of gelatin;

(6) A layer comprising the acrylic latex sold by Rohm and Haas Co. under the trade designation B–15 and polyacrylamide coated at a coverage of about 100 mgs./ft.² of B–15 and about 10 mgs./ft.² of polyacrylamide;

(7) A layer of the yellow dye developer 4-(p-[$\beta$-hydroquinonylethyl]-phenylazo) - 3 - (N,n-hexylcarboxamido)-1 - phenyl - 5 - pyrazolone and the auxiliary developer 4'-methylphenyl hydroquinone dispersed in gelatin and coated at a coverage of about 50 mgs./ft.² of dye, about 15 mgs./ft.² of auxiliary developer and 50 mgs./ft.² of gelatin;

(8) A blue-sensitive gelatino-silver iodobromide emulsion coated at a coverage of about 75 mgs./ft.² of silver and about 75 mgs./ft.² of gelatin; and (9) A layer of gelatin coated at a coverage of about 50 mgs./ft.² of gelatin.

Then a transparent 4 mil. polyethylene terephthalate film base may be coated, in succession, with the following illustrative layers:

(1) A 7:3 mixture, by weight, of polyethylene/maleic acid copolymer and polyvinyl alcohol at a coverage of about 1400 mgs./ft.², to provide a polymeric acid layer;

(2) A graft copolymer of acrylamide and diacetone acrylamide on a polyvinyl alcohol backbone in a molar ratio of 1:3.2:1 at a coverage of about 800 mgs./ft.², to provide a polymeric spacer layer; and (3) a 2:1 mixture, by weight, of polyvinyl alcohol and poly-4-vinylpyridine, at a coverage of about 900 mgs./ft.² and including about 20 mgs./ft.² phenyl mercapto tetrazole, to provide a polymeric image-receiving layer.

The two components thus prepared may then be taped together in laminate form, at their respective edges, by means of a pressure-sensitive binding tape extending around, in contact with, and over the edges of the resultant laminate.

A rupturable container comprising an outer layer of lead foil and an inner linear or layer of polyvinyl chloride retaining an aqueous alkaline processing solution comprising:

| | |
|---|---|
| Water _____cc__ | 100 |
| Potassium hydroxide _____gms__ | 11.2 |
| Hydroxyethyl cellulose (high viscosity) [commercially available from Hercules Powder Co., Wilmington, Delaware, under the trade name Natrosal 250] _____gms__ | 3.4 |
| N-phenethyl-$\alpha$-picolinium bromide _____gms__ | 2.7 |
| Benzotriazole _____gms__ | 1.15 |
| Titanium dioxide _____gms__ | 50.0 |
| (A) ¹ _____gms__ | 2.08 |

¹ Formula:

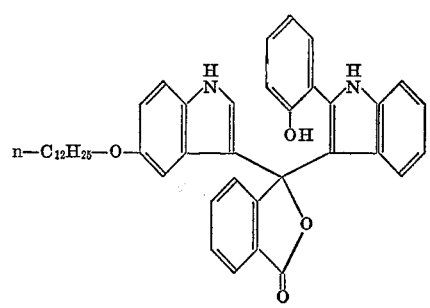

(B) [2] _____ gms__ 0.52

[2] Formula:

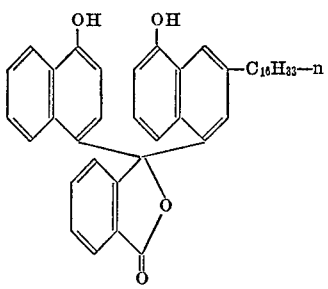

(C) [3] _____ gms__ 1.18

[3] Formula:

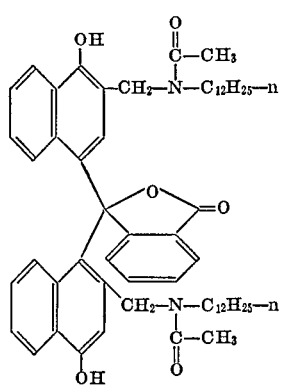

may then be fixedly mounted on the leading edge of each of the laminates, by pressure-sensitive tapes interconnecting the respective containers and laminates, such that, upon application of compressive pressure to a container, its contents may be distributed, upon rupture of the container's marginal seal, between the polymeric image-receiving layer and next adjacent gelatin layer.

The photosensitive composite film units may be exposed through radiation incident on the transparent cellulose triacetate layer and processed by passage of the exposed film units through appropriate pressure-applying members, such as suitably gapped, opposed rolls, to effect rupture of the container and distribution of its contents. During processing, the multicolor dye transfer image formation may be viewed through the transparent cellulose triacetate layer against the titanium dioxide background provided by distribution of the pigment containing processing composition between layer 9 and the polymeric image-receiving layer. Multicolor dye transfer image formation will be found to be substantially completed and exhibiting the required color brilliance, hues, saturation and isolation, within a period of approximately 90 seconds. The image formation may be immediately viewed upon distribution of the processing composition by reason of the protection against incident radiation afforded the photo-sensitive silver halide emulsion layers by the composition's optical transmission density of $>\sim 6.0$ density units and against the titanium dioxide's effective reflective background afforded by reason of the composition possessing an optical reflection density $<\sim 1.0$ density units.

The osmotic transpiration of processing solvent vapor in a film unit prepared and processed in the manner just described will be such that the film unit containing the color transfer image is regarded as about 75% dry in about 36 hours and substantially dry in about five days. This reduction in solvent concentration effectively reduces the solvent concentration sufficiently rapidly to one at which the dye developer is substantially insoluble so as to preclude the unwanted dye transfer and the resulting loss of image quality which may inherently occur if the solvent concentration were not so reduced. It will be noted that this reduction in solvent concentration, from a first solvent concentration at which the dye developer is diffusible to one at which it is not, is not as rapid as the rate of decrease in solvent concentration obtainable by employing two relatively vapor permeable dimensionally stable layers, e.g., two cellulose triacetate layers. As was mentioned previously, however, the rate of decrease in solvent concentration is sufficient to accomplish its objective, namely to obviate the aforementioned loss of image quality due to unwanted dye transfer. Moreover, the use of a relatively impervious dimensionally stable layer, e.g., the polyester terephthalate, in lieu of a less rigid vapor permeable layer such as a cellulose triacetate layer of about the same thickness provides the additional advantage of increased rigidity and resistance to distortion of the film unit, i.e., the film unit containing the transfer image remains appreciably more planar and free of distortion.

The pH and solvent concentration of the alkaline processing solution initially employed must possess a pH above the pKa of the optical filter agents, that is, the pH at which about 50% of the agents are present as the lesser absorbing species and about 50% are present as the greater absorbing species, preferably a pKa of $>\sim 11$ and most preferably $>\sim 12$ and a pH at which the dye developers employed are soluble and diffusible. Although it has been found that the specific pH to be employed may be readily determined empirically for any dye developer and optical filter agent, or group of dye developers and filter agents, most particularly desirable dye developers are soluble at pH's above 9 and relatively insoluble at pH's below 9, in reduced form, and relatively insoluble at substantially any alkaline pH, in oxidized form, and the system can be readily balanced accordingly for such dye developers. In addition, although as previously noted, the processing composition, in the preferred embodiment, will include the stated film-forming viscosity-increasing agent, or agents, to facilitate spreading of the composition and to provide maintenance of the spread composition as a structurally stable layer of the laminate, subsequent to distribution, it is not necessary that such agent be employed as a component of the composition.

Neutralizing means, for example, a polymeric acid layer of the type discussed above is preferably incorporated, as stated, in the film unit of the present invention, to provide reduction of the alkalinity of the processing solution from a pH above the pKa of the optical filter agent selected at which the dyes are soluble to a pH below the pKa of the agent at which the dyes are substantially nondiffusible, in order to advantageously further stabilize and optimize reflectivity of the dye transfer image. In such instance, the neutralizing layer may comprise particulate acid reacting reagent disposed within the film unit or a polymeric acid layer, for example, a polymeric acid layer approximating 0.3 to 1.5 mils. in thickness, positioned intermediate the transparent support and image-receiving layer, and/or the opaque support and next adjacent emulsion/dye unit layer, and the film unit may also contain a polymeric spacer or barrier layer, for example, approximating 0.1 to 0.7 mil. in thickness, next adjacent the polymeric acid layer, opposite the respective support layer, as previously described.

Specifically, the film units may employ the presence of a polymeric acid layer such as, for example, of the type set forth in U.S. Patent No. 3,362,819 which, most preferably, includes the presence of an inert timing or spacer layer intermediate the polymeric acid layer carried on a support and the image-receiving layer.

As set forth in the last-mentioned patent, the polymeric acid layer may comprise polymers which contain acid groups, such as carboxylic acid and sulfonic acid groups, which are capable of forming salts with alkali metals, such as sodium, potassium etc., or with organic bases, particularly quaternary ammonium bases, such as tetramethyl ammonium hydroxide, or potentially acid-yielding groups, such as anhydrides or lactones, or other groups which are capable of reacting with bases to capture and retain them. The acid-reacting group is, of course, retained in the polymer layer. In the preferred embodiments disclosed, the polymer contains free carboxyl groups and the transfer processing composition employed contains a large concentration of sodium and/or potassium ions. The acid polymers stated to be most useful are characterized by containing free carboxyl groups, being insoluble in water in the free acid form, and by forming water-soluble sodium and/or potassium salts. One may also employ polymers containing carboxylic acid anhydride groups, at least some of which preferably have been converted to free carboxyl groups prior to imbibition. While the most readily available polymeric acids are derivatives of cellulose or of vinyl polymers, polymeric acids from other classes of polymers may be used. As examples of specific polymeric acids set forth in the application, mention may be made of dibasic acid half-ester derivatives of cellulose which derivatives contain free carboxyl groups, e.g., cellulose acetate hydrogen phthalate, cellulose acetate hydrogen glutarate, cellulose acetate hydrogen succinate, ethyl cellulose hydrogen succinate, ethyl cellulose acetate hydrogen succinate, cellulose acetate hydrogen succinate hydrogen phthalate; ether and ester derivatives or cellulose modified with sulfoanhydrides, e.g., with ortho-sulfobenzoic anhydride; polystyrene sulfonic acid; carboxymethyl cellulose; polyvinyl hydrogen phthalate; polyvinyl acetate hydrogen phthalate; polyacrylic acid; acetals of polyvinyl alcohol with carboxy or sulfo substituted aldehydes, e.g., o-, m-, or p-benzaldehyde sulfonic acid or carboxylic acid; partial esters of ethylene/maleic anhydride copolymers; partial esters of methyl-vinyl ether/maleic anhydride copolymers; etc.

As previously noted, the pH of the processing composition preferably is of the order of at least 12 to 14 and the pKa of the selected optical filter agents will accordingly preferably be in the order of 13 or greater. The polymer layer is disclosed to contain at least sufficient acid groups to effect a reduction in the pH of the image layer from a pH of about 12 to 14 to a pH of at least 11 or lower at the end of the imbibition period, and preferably to a pH of about 5 to 8 within a short time after imbibition, thus requiring, of course, that the action of the polymeric acid be accurately so controlled as not to interfere with either development of the negative or image transfer of unoxidized dye developers. For this reason, the pH of the image layer must be kept at a functional transfer level, for example, 12 to 14 until the dye image has been formed after which the pH is reduced very rapidly to a pH below that at which dye transfer may be accomplished, for example, at least about 11 and preferably about pH 9 to 10. Unoxidized dye developers containing hydroquinonyl developing radicals diffuse from the negaive to the positive as the sodium or other alkali salt. The diffusion rate of such dye image-forming components thus is at least partly a function of the alkali concentration, and it is necessary that the pH of the image layer remain on the order of, for example, 12 to 14 until transfer of the necessary quantity of dye has been accomplished. The subsequent pH reduction, in addition to its desirable effect upon image light stability, serves a highly valuable photographic function by substantially terminating further dye transfer.

In order to prevent premature pH reduction during transfer processing, as evidenced, for example, by an undesired reduction in positive image density, the acid groups are disclosed to be so distributed in the polymer layer that the rate of their availability to the alkali is controllable, e.g., as a function of the rate of swelling of the polymer layer which rate in turn has a direct relationship to the diffusion rate of the alkali ions. The desired distribution of the acid groups in the polymer layer may be effected by mixing acid polymer with a polymer free of acid groups, or lower in concentration of acid groups, and compatible therewith, or by using only an acid polymer but selecting one having a relatively lower proportion of acid groups. These embodiments are illustrated, respectively, in the cited copending application, by (a) a mixture of cellulose acetate and cellulose acetate hydrogen phthalate and (b) a cellulose acetate hydrogen phthalate polymer having a much lower percentage of phthalyl groups than the first-mentioned cellulose acetate hydrogen phthalate.

It is also there disclosed that the layer containing the polymeric acid may contain a water-insoluble polymer, preferably a cellulose ester, which acts to control or modulate the rate at which the alkali salt of the polymer acid is formed. As examples of cellulose esters contemplated for use, mention is made of cellulose acetate, cellulose acetate butyrate, etc. The particular polymers and combinations of polymers employed in any given embodiment are, of course, selected so as to have adequate wet and dry strength and when necessary or desirable, suitable subcoats are employed to help the various polymeric layers adhere to each other during storage and use.

The inert spacer layer of the last-mentioned patent, for example, an inert spacer layer comprising polyvinyl alcohol or gelatin, acts to "time" control the pH reduction by the polymeric acid layer. This timing is discolsed to be a function of the rate at which the alkali diffuses through the inert spacer layer. It is there stated to have been found that the pH does not drop until the alkali has passed through the spacer layer, i.e., the pH is not reduced to any significant extent by the mere diffusion into the interlayer, but the pH drops quite rapidly once the alkali diffuses through the spacer layer.

As disclosed in aforementioned U.S. Patent No. 3,362,819, the presence of an inert spacer layer was found to be effective in evening out the various reaction rates over a wide range of temperatures, for example, by preventing premature pH reduction when imbibition is effected at temperatures above room temperature, for example, at 95 to 100° F. By providing an inert spacer layer, that application discloses that the rate at which alkali is available for capture in the polymeric acid layer becomes a function of the alkali diffusion rates.

However, as disclosed in U.S. Patent No. 3,455,686 preferably the aforementioned rate at which the cations of the alkaline processing composition, i.e., alkali ions, are available for capture in the polymeric acid layer should be decreased with increasing transfer processing temperatures in order to provide diffusion transfer color processes relatively independent of positive transfer image variations over an extended range of ambient temperatures.

Specifically, it is there stated to have been found that the diffusion rate of alkali through a permeable inert polymeric spacer layer increases with increased processing temperature to the extent, for example, that at relatively high transfer processing temperatures, that is, transfer processing temperatures above approximately 80° F., a premature decrease in the pH of the transfer processing composition occurs due, at least in part, to the rapid diffusion of alkali from the dye transfer environment and its subsequent neutralization upon contact with the polymeric acid layer. This was stated to be especially true of alkali traversing an inert spacer layer prossessing permeability to alkali optimized to be effective with the temperature range of optimum transfer processing. Conversely, at temperatures below the optimum transfer processing range, for example, temperatures below approximately 40° F., the last-mentioned inert spacer layer was disclosed to provide an effective diffusion barrier timewise preventing effective traverse of the inert spacer layer by alkali having temperature depressed diffusion rates and to result in maintenance of the transfer processing environment's high pH of such an extended time interval as to facilitate formation of transfer image stain and its resultant degradation of the positive transfer images' color definition.

It is further stated in the last-mentioned U.S. Patent No. 3,455,686 to have been found, however, that if the inert spacer layer of the print-receiving element is replaced by a spacer layer which comprises a permeable polymeric layer exhibiting permeability inversely dependent on temperature, that is, a polymeric film-forming material which exhibits decreasing permeability to solubilized alkali derived cations such as alkali metal and quaternary ammonium ions under conditions of increasing temperature, that the positive transfer image defects resultant from the aforementioned overextended pH maintenance and/or premature pH reduction are obviated.

As examples of polymers which were disclosed to exhibit inverse temperature-dependent permeability to alkali, mention may be made of: hydroxypropyl polyvinyl alcohol, polyvinyl methyl ether, polyethylene oxide, polyvinyl oxazolidone, hydroxypropyl methyl cellulose, isopropyl cellulose, partial acetals of polyvinyl alcohol such as partial polyvinyl butyral, partial polyvinyl formal, partial polyvinyl acetal, partial polyvinyl propional, and the like.

The last-mentioned specified acetals of polyvinyl were stated to generally comprise saturated aliphatic hydrocarbon chains of a molecular weight of at least 1000, preferably of about 1000 to 50,000, possessing a degree of acetalation within about 10 to 30%, 10 to 30%, 20 to 80%, and 10 to 40%, of the polyvinyl alcohol's theoretical polymeric hydroxy groups, respectively, and including mixed acetals where desired.

Where desired, a mixture of the polymers may be employed, for example, a mixture of hydroxypropyl methyl cellulose and partial polyvinyl butyral.

Employment of the detailed and preferred film units of the present invention, according to the herein described color diffusion transfer process, specifically provides for the production of a highly stable transfer image accomplished, at least in part, by effectively obviating the previously discussed disadvantages of the prior art products and processes by in process adjustment of the environmental processing composition solvent and pH concentration from a solvent and pH concentration at which dye diffusion or transfer is operative to a solvent and pH concentration at which dye transfer is inoperative subsequent to substantial transfer image formation. The stable color transfer image is obtained irrespective of the fact that the film unit is maintained as an integral laminate unit during exposure, processing, viewing, and storage of the unit. Accordingly, by means of the present invention, multicolor transfer images may be provided over an extended processing temperature range which exhibit desired maximum and minimum dye transfer image densities; yellow, magenta and cyan dye saturation red, green and blue hues; and color separation. These unexpected advantages are in addition to the manufacturing advantages obtained by reason of the present invention's integral color transfer film unit construction and which will be readily apparent from examination of the unit's parameters, that is, for example, advantages in more efficient utilization of fabricating materials and components, enhanced simplicity of film manufacture and camera design and construction, and more simplified and effectively controlled customer utilization of the unit.

The dimensionally stable vapor permeable support layer referred to may comprise any of the various types of conventional opaque and transparent rigid or flexible materials possessing the requisite liquid impermeability and vapor transmissivity denoted above, and may comprise polymeric films of both synthetic types and those derived from naturally occurring products. Particularly suitable materials include aqueous alkaline solution impermeable, flexible polymeric materials such as polymeric films derived from ethylene glycol terephthalic acid, vinyl chloride polymers; polyvinyl acetate; polyamides; polymethacrylic acid methyl and ethyl esters; cellulose derivatives such as cellulose, acetate, triacetate, nitrate, propionate, butyrate, acetate-propionate, or acetate-butyrate; alkaline solution impermeable, water vapor permeable papers; crosslinked polyvinyl alcohol; regenerated cellulose; and the like.

As heretofore noted, the relatively vapor impermeable dimensionally stable layer may be substantially vapor impermeable or it may possess a vapor permeability up to 15% of the vapor permeability of the vapor permeable layer. As examples of such materials, mention may be made of the known polyesters, e.g., the polyethylene terephthalates, polycarbonates, etc.; as well as composite structures including a vapor permeable material and an impermeable layer or coating.

As examples of materials, for use as the image-receiving layer, mention may be made of solution dyeable polymers such as nylon as, for example, N-methoxymethyl polyhexamethylene adipamide; partially hydrolyzed polyvinyl acetate; polyvinyl alcohol with or without plasticizers; cellulose acetate with filler as, for example, one-half cellulose acetate and one-half oleic acid; gelatin; and other materials of a similar nature. Preferred materials comprise polyvinyl alcohol or gelatin containing a dye mordant such as poly-4-vinylpyridine, as disclosed in U.S. Patent No. 3,148,061, issued Sept. 8, 1964.

It will be noted that the liquid processing composition employed may contain an auxiliary or accelerating developing agent, such as p-methylaminophenol, 2,4-diaminophenol, 2,4-diaminophenol, p-benzylaminophenyl, hydroquinone, toluhydroquinone, phenylhydroquinone, 4'-methylphenylhydroquinone, etc. It is also contemplated to employ a plurality of auxiliary or accelerating developing agents, such as a 3-pyrazolidone developing agent and a benzenoid developing agent, as disclosed in U.S. Patent No. 3,039,869, issued June 19, 1962. As examples of suitable combinations of auxiliary developing agents, mention may be made of 1-phenyl-3-pyrazolidone in combination with p-benzylaminophenol and 1-phenyl-3-pyrazolidone in combination with 2,5-bis-ethylenimino-hydroquinone. Such auxiliary developing agents may be employed in the liquid processing composition or they may be initially incorporated, at least in part, in any one or more of the silver halide emulsion strata, the strata containing the dye developers, the interlayers, the overcoat layer, or layers, of the film unit. It may be noted that at least a portion of the dye developer oxidized during development may be oxidized and immobilized as a result of a reaction, e.g., an energy-transfer reaction, with the oxidation product of an oxidized auxiliary developing agent, the latter developing agent being oxidized by the development of exposure silver halide. Such a reaction of oxidized developing agent with unoxidized dye developer would regenerate the auxiliary developing agent for further reaction with the exposed silver halide.

In addition, development may be effected in the presence of an onium compound, particularly a quaternary ammonium compound, in accordance with the processes disclosed in U.S. Patent No. 3,173,786, issued Mar. 16, 1965.

It will be apparent that the relative proportions of the agents of the diffusion transfer processing composition may be altered to suit the requirements of the operator. Thus, it is within the scope of this invention to modify the herein described developing compositions by the substitution of preservatives, alkalies, etc., other than those specifically mentioned, provided that the pH of the composition is initially at the first pH and solvent concentration required. When desirable, it is also contemplated to include, in the developing composition, components such as restrainers, accelerators, etc. Similarly, the concentration of various components may be varied over a wide range and when desirable adaptable components may be disposed in the photosensitive element, prior to exposure, in a separate permeable layer of the photosensitive element and/or in the photosensitive emulsion.

In all examples of this specification, percentages of components are given by weight unless otherwise indicated.

An extensive compilation of specific dye developers particularly adapted for employment in photographic diffusion transfer processes is set forth in aforementioned U.S. Patent No. 2,983,606 and in the various copending U.S. applications referred to in that patent, especially in the table of U.S. applications incorporated by reference into the patent as detailed in column 27. As examples of additional U.S. patents detailing specific dye developers for photographic transfer process use, mention may also be made of U.S. Pats. Nos. 2,983,605; 2,992,106; 3,047,386; 3,076,808; 3,076,820; 3,077,402; 3,126,280; 3,131,061; 3,134,762; 3,134,765; 3,135,604; 3,135,605; 3,135,606; 3,135,734; 3,141,772; 3,142,565; and the like.

As additional examples of synthetic, film-forming, permeable polymers particularly adapted to retain dispersed dye developer, mention may be made of nitrocarboxymethyl cellulose, as disclosed in U.S. Pat. No. 2,992,104; an acylamidobenzene sulfo ester of a partial sulfobenzal of polyvinyl alcohol, as disclosed in U.S. Pat. No. 3,043,692; polymers of N-alkyl-$\alpha,\beta$-unsaturated carboxamides and copolymers of N - alkyl-$\alpha,\beta$-carboxamides with N-hydroxyalkyl - $\alpha,\beta$ - unsaturated carboxamides, as disclosed in U.S. Pat. No. 3,069,263; copolymers of vinylphthalimide and $\alpha,\beta$-unsaturated carboxylic acids, as disclosed in U.S. Pat. No. 3,061,428; copolymers of N-vinylpyrrolidones and $\alpha,\beta$-unsaturated carboxylic acids and terpolymers of N-vinylpyrrolidones, $\alpha,\beta$-unsaturated carboxylic acids and alkyl esters of $\alpha,\beta$-unsaturated carboxylic acids, as disclosed in U.S. Pat. No. 3,044,873; copolymers of N,N-dialkyl - $\alpha,\beta$ - unsaturated carboxamides with $\alpha,\beta$-unsaturated carboxylic acids, the corresponding amides of such acids, and copolymers of N-aryl- and N-cycloalkyl - $\alpha,\beta$ - unsaturated carboxamides with $\alpha,\beta$-unsaturated carboxylic acids, as disclosed in U.S. Pat. No. 3,069,296; and the like.

In addition to conventional techniques for the direct dispersion of a particulate solid material in a polymeric, or colloidal, matrix such as ball-milling and the like techniques, the preparation of the dye developer dispersion may also be obtained by dissolving the dye in an appropriate solvent, or mixture of solvents, and the resultant solution distributed in the polymeric binder, with optional subsequent removal of the solvent, or solvents, employed, as, for example, by vaporization where the selected solvent, or solvents, possesses a sufficiently low boiling point or washing where the selected solvent, or solvents, possesses a sufficiently high differential solubility in the wash medium, for example, water, when measured against the solubility of the remaining composition components, and/or obtained by dissolving both the polymeric binder and dye in a common solvent.

For further detailed treatment of solvent distribution systems of the types referred to above, and for an extensive compilation of the conventional solvents traditionally employed in the art to effect distribution of photographic color-providing materials in polymeric binders, specifically for the formation component layers of photographic film units, reference may be made to U.S. Pats. Nos. 2,269,158; 2,322,027; 2,304,939; 2,304,940; 2,801,171; and the like.

Although the invention has been discussed in detail throughout employing dye developers, the preferred image-providing materials, it will be readily recognized that other, less preferred, image-providing materials may be substituted in replacement of the preferred dye developers in the practice of the invention. For example, there may be employed dye image-forming materials such as those disclosed in U.S. Pats. No. 2,647,049; 2,661,293; 2,698,244; 2,698,798; 2,802,735; 3,148,062; 3,227,550; 3,227,551; 3,227,552; 3,227,554; 3,243,294; 3,330,655; 3,347,671; 3,352,672; 3,364,022; 3,443,939; 3,443,940; 3,443,941; 3,443,943; etc., wherein color diffusion transfer processes are described which employ color coupling techniques comprising, at least in part, reacting one or more color developing agents and one or more color formers or couplers to provide a dye transfer image to a superposed image-receiving layer and those disclosed in U.S. Pat. No. 2,774,668 and 3,087,817, wherein color diffusion transfer processes are described which employ the imagewise differential transfer of complete dyes by the mechanisms therein described to provide a transfer dye image to a contiguous image-receiving layer, and thus including the employment of image-providing materials in whole or in part initially insoluble or nondiffusible as disposed in the film unit which diffuse during processing as a direct or indirect function of exposure.

For the production of the photosensitive gelatino silver halide emulsions employed to provide the film unit, the silver halide crystals may be prepared by reacting a water-soluble silver salt, such as silver nitrate, with at least one water-soluble halide, such as ammonium, potassium or sodium bromide, preferably together with a corresponding iodide, in an aqueous solution of a peptizing agent such as a colloidal gelatin solution; digesting the dispersion at an elevated temperature, to provide increased crystal growth; washing the resultant water-soluble salts by chilling the dispersion, noodling the set dispersion, and washing the noodles with cold water, or alternatively, employing any of the various floc systems, or procedures, adapted to effect removal of undesired components, for example, the procedures described in U.S. Pats. Nos. 2,614,928; 2, 614,929; 2,728,662; and the like; after-ripening the dispersion at an elevated temperature in combination with the addition of gelatin and various adjuncts, for example, chemical sensitizing agents of U.S. Pats. Nos. 1,574,944; 1,623,499; 2,410,689; 2,597,856; 2,597,915; 2,487,850; 2,518,698; 2,521,926; and the like; all according to the traditional procedures of the art, as described in Neblette, C. B., Photography Its Materials and Processes, 6th Ed., 1962.

Optical sensitization of the emulsion's silver halide crystals may be accomplished by contact of the emulsion composition with an effective concentration of the selected optical sensitizing dyes dissolved in an appropriate dispersing solvent such as methanol, ethanol, acetone, water, and the like; all according to the traditional procedures of the art, as described in Hammer, F. M., The Cyanine Dyes and Related Compounds.

Additional optional additives, such as coating aids, hardeners, viscosity-increasing agents, stabilizers, preservatives, and the like, for example, those set forth hereinafter, also may be incorporated in the emulsion formulation, according to the conventional procedures known in the photographic emulsion manufacturing art.

The photoresponsive material of the photographic emulsion will, as previously described, preferably comprise a crystal of silver, for example, one or more of the silver halides such as silver chloride, silver iodide, silver bromide, or mixed silver halides such as silver chlorobromide, silver chloroiodobromide or silver iodobromide, of varying halide ratios and varying silver concentrations.

As the binder for the respective emulsion strata, the aforementioned gelatin may be, in whole or in part, replaced with some other colloidal material such as albumin; casein; or zein; or resins such as a cellulose derivatives, as described in U.S. Patents Nos. 2,322,085 and 2,327,808; polyacrylamides, as described in U.S. Patent No. 2,541,474; vinyl polymers such as described in an extensive multiplicity of readily available U.S. and foreign patents.

In preferred embodiments of the present invention, the photosensitive silver halide emulsions employed will be emulsions adapted to provide a Diffusion Transfer Process Exposure Index $>\sim 50$, which Index indicates the correct exposure rating of a diffusion transfer color process at which an exposure meter, calibrated to the ASA Exposure Index, must be set in order that it give correct exposure data for producing color transfer prints of satisfactorily high quality. The Diffusion Transfer Process Exposure Index is based on a characteristic H&D curve relating original exposure of the photosensitive silver halide emulsions to the respective curve densities forming the resultant transfer image. Thus, the Diffusion Transfer Exposure Index is based on the exposure to which the photosensitive silver halide emulsions, for use in color diffusion transfer processes, must be subjected in order to obtain an acceptable color transfer image by that process and is a direct guide to the exposure setting to be entered in a camera in order to obtain proper exposure of the film unit.

Although the preceding description of the invention has been couched in terms of the preferred photosensitive component construction wherein at least two selectively sensitized photosensitive strata are in contiguous coplanar relationship and, specifically, in terms of the preferred tripack type structure comprising a red-sensitive silver halide emulsion stratum, a green-sensitive silver halide emulsion stratum and a blue-sensitive silver halide emulsion stratum having associated therewith, respectively a cyan dye developer, a magenta dye developer and a yellow dye developer, the photosensitive component of the film unit may comprise at least two sets of selectively sensitized minute photosensitive elements arranged in the form of a photosensitive screen wherein each of the minute photosensitive elements has associated therewith, for example, an appropriate dye developer in or behind its respective silver halide emulsion portion. In general, a suitable photosensitive screen will comprise minute red-sensitized emulsion elements, minute green-sensitized emulsion elements and minute blue-sensitized emulsion elements arranged in side-by-side relationship in a screen pattern and having associated therewith, respectively, a cyan, a magenta and a yellow dye developer.

The present invention also includes the employment of a black dye developer and the use of a mixture of dye developers adapted to provide a black-and-white transfer image, for example, the employment of dye developers of the three subtractive colors in an appropriate mixture in which the quantities of the dye developers are proportioned such that the colors combine to provide black.

Where in the specification, the expression "positive image" has been used, this expression should not be interpreted in a restrictive sense since it is used primarily for purposes of illustration, in that it defines the image produced on the image-carrying layer as being reversed, in the positive-negative sense, with respect to the image in the photosensitive emulsion layers. As an example of an alternative meaning for "positive image," assume that the photosensitive element is exposed to actinic light through a negative transparency. In this case, the latent image in the photosensitive emulsion layers will be a positive and the dye image produced on the image-carrying layer will be a negative. The expression "positive image" is intended to cover such an image produced on the image-carrying layer.

It will be recognized that, by reason of the preferred film unit's structural parameters, the transfer image formed upon directed exposure of the film unit to a selected subject and processing, will be a geometrically reversed image of the subject. Accordingly, to provide transfer image formation geometrically nonreversed, exposure of such film unit should be accomplished through an image reversing optical system such a camera possessing an image reversing optical system.

In addition to the described essential layers, it will be recognized that the film unit may also contain one or more subcoats or layers, which, in turn, may contain one or more additives such as plasticizers, intermediate essential layers for the purpose, for example, of improving adhesion, and that any one or more of the described layers may comprise a composite of two or more strata of the same, or different, components and which may be contiguous, or separated from, each other, for example, two or more neutralizing layers or the like, one of which may be disposed intermediate the cyan dye image-forming component retaining layer and the dimensionally stable opaque layer.

While in the illustrative film unit described in the foregoing specification, the dimensionally stable layer associated with the negative component and shown in the drawing as layer 14, was described as the vapor permeable layer and the dimensionally stable layer associated with the positive component was described as being the relatively impervious dimensionally stable layer, it is immaterial for purposes of this invention which of these two layers is permeable and which is not. Thus, the transparent layer associated with the positive component may in fact be vapor permeable to accomplish the objectives of this invention, while the dimensionally stable layer associated with the negative component is relatively impermeable.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. A photographic film unit comprising a negative component including at least one light-sensitive silver halide layer having associated therewith a dye image-forming material for providing, as a function of development of the associated silver halide, an image-wise distribution of a mobile and diffusible color-providing material; a positive component including a dyeable stratum adapted for receiving said diffusible color-providing material to provide a color transfer image; and means for providing an opacifying agent between said negative and positive components to mask said negative component and to provide a background for viewing by reflected light the color transfer image imparted to said dyeable stratum without separation of said positive component containing said transfer image from said negative component; said positive and negative components being confined in superposition between a pair of dimensionally stable layers, one of said dimensionally stable layers being vapor permeable to permit osmotic transpiration of solvent for the processing composition employed to develop said film unit to decrease the solvent concentration of said processing composition from a first solvent concentration at which the dye image-forming material is soluble and diffusible to a second solvent concentration at which it is substantially non-diffusible, the other of said dimensionally stable layer being impervious or relatively impervious to solvent vapor, at least the dimensionally stable layer associated with the positive component being substantially transparent to permit viewing therethrough of the color transfer image imparted, as a function of development, to said positive component.

2. A film unit as defined in claim 1 including means for applying between said positive and negative components a processing composition having said first solvent concentration.

3. A film unit as defined in claim 2 wherein said processing composition comprises an aqueous alkaline solution and said film unit further includes means for reducing the pH of said processing composition subsequent to substantial dye transfer image formation.

4. A film unit as defined in claim 1 wherein said vapor impervious or relatively vapor impervious dimensionally stable layer possesses a vapor permeability not in excess of about fifteen percent of the vapor permeability of the other of said dimensionally stable layers.

5. A film unit as defined in claim 1 wherein said vapor permeable dimensionally stable layer possesses a vapor transmission rate for said processing composition solvent averaging not less than about 100 grams/24 hours/100 square inches/mil.

6. A film unit as defined in claim 2 wherein said dimensionally stable layer associated with said negative component is opaque to incident radiation actinic to said silver halide and said opacifying agent includes an inorganic light-reflecting pigment and is disposed in said processing composition.

7. A photographic film unit comprising, in order, a first dimensionally stable layer opaque to visible light; a red-sensitive silver halide layer having associated therewith a cyan dye image-forming material; a green-sensitive silver halide layer having associated therewith a magenta dye image-forming material; a blue-sensitive silver halide layer having associated therewith a yellow dye image-forming material, each of said dye image-forming materials being processing composition soluble and diffusible as a function of the point-to-point degree of exposure of its associated silver halide layer; a dyeable stratum adapted to receive said soluble and diffusible dye image-forming materials diffusing thereto; a second dimensionally stable layer which is transparent to permit viewing therethrough of a dye transfer image formed by diffusion of said dye image-forming material to said dyeable stratum; means for providing an opacifying agent between said dyeable stratum and said blue-sensitive silver halide layer and associated yellow dye image-forming material to mask said silver halide layers and associated dye image-forming materials and to provide a background for viewing by reflected light the color transfer image imparted to said dyeable stratum without separation of said dyeable stratum containing said color transfer image; and means for applying between said dyeable stratum and said blue-sensitive layer and associated yellow dye image-forming material an aqueous alkaline processing composition having a solvent concentration at which said dye image-forming materials are soluble and diffusible, one of said dimensionally stable layers being vapor permeable to permit osmotic transpiration of solvent for said processing composition employed to develop said film unit to decrease said solvent concentration of said processing composition from said concentration at which said dye image-forming materials are soluble and diffusible to a lower solvent concentration at which they are substantially non-diffusible, the other of said dimensionally stable layers being impervious or relatively impervious to solvent vapor.

8. A photographic film unit as defined in claim 7 wherein said means for applying said processing composition comprises a rupturable container retaining the processing composition which is positioned extending transverse an edge of the film unit to effect, upon application of compressive pressure to the container, discharge of the container's processing composition contents intermediate said dyeable stratum and said blue-sensitive silver halide layer.

9. A film unit as defined in claim 7 wherein said dye image-forming materials are compounds which are initially mobile and diffusible in an aqueous alkaline medium but which are selectively rendered immobile and non-diffusible as a function of development of the associated silver halide layers.

10. A film unit as defined in claim 9 wherein each of said dye image-forming materials is a dye which is a silver halide developing agent.

11. A film unit as defined in claim 7 including a neutralizing layer for reducing the pH of said processing composition subsequent to substantial dye transfer image formation.

12. A film unit as defined in claim 11 wherein said neutralizing layer comprises a polymeric acid layer positioned between said dyeable stratum and said transparent dimensionally stable layer.

13. A film unit as defined in claim 12 wherein said vapor impervious or relatively vapor impervious dimensionally table layer possessing a vapor permeability not in excess of about 15% of the vapor permeability of the other of said dimensionally stable layers.

14. A film unit as defined in claim 12 wherein said vapor permeable dimensionally stable layer possesses a vapor transmission rate for said processing composition solvent averaging not less than about 100 grams/24 hours/100 square inches/mil.

15. A film unit as defined in claim 7 wherein said opacifying agent includes an inorganic light-reflecting pigment and said means for providing said opacifying agent comprises including said opacifying agent in said processing composition.

16. A process for forming a color transfer image comprising the steps of exposing a film unit as defined in claim 1 to form a developable image; applying between said silver halide layer and said dyeable stratum said opacifying agent and said processing composition to effect development of said silver halide layer and to form, as a function of said development, an imagewise distribution of mobile and diffusible color-forming material; transferring by diffusion, at least a portion of said imagewise distribution to said dyeable stratum to impart thereto a dye transfer image which is viewable by reflected light without separation of said dyeable stratum containing said dye transfer image; and maintaining said film unit intact subsequent to processing.

17. A process as defined in claim 16 wherein said dimensionally stable layer associated with the negative component of said film unit is opaque to radiation actinic to said silver halide and said opacifying agent is disposed in said processing composition.

References Cited
UNITED STATES PATENTS

| | | | |
|---|---|---|---|
| 3,573,044 | 3/1971 | Land | 96—3 |
| 3,415,644 | 12/1968 | Land | 96—3 |

NORMAN G. TORCHIN, Primary Examiner

A. T. SURO PICO, Assistant Examiner

U.S. Cl. X.R.

96—29 D, 77